(12) United States Patent
Smith

(10) Patent No.: US 10,480,593 B2
(45) Date of Patent: Nov. 19, 2019

(54) SPRAGUE CARRIER

(71) Applicant: Justin Smith, Wittman, AZ (US)

(72) Inventor: Justin Smith, Wittman, AZ (US)

( * ) Notice: Subject to any disclaimer, the term of this patent is extended or adjusted under 35 U.S.C. 154(b) by 0 days.

(21) Appl. No.: 16/042,929

(22) Filed: Jul. 23, 2018

(65) Prior Publication Data

US 2018/0328417 A1   Nov. 15, 2018

Related U.S. Application Data

(63) Continuation of application No. 15/832,443, filed on Dec. 5, 2017, now Pat. No. 10,030,718.

(60) Provisional application No. 62/430,055, filed on Dec. 5, 2016.

(51) Int. Cl.

| | |
|---|---|
| *F16D 41/064* | (2006.01) |
| *F16D 27/02* | (2006.01) |
| *F16D 41/067* | (2006.01) |
| *B60K 17/16* | (2006.01) |

(52) U.S. Cl.
CPC .......... *F16D 27/02* (2013.01); *F16D 41/064* (2013.01); *F16D 41/067* (2013.01); *B60K 17/16* (2013.01)

(58) Field of Classification Search
None
See application file for complete search history.

(56) References Cited

U.S. PATENT DOCUMENTS

| | | | |
|---|---|---|---|
| 6,409,000 B1 * | 6/2002 | Itoh ........................ | B60K 17/26 180/247 |
| 8,840,514 B1 * | 9/2014 | Knickerbocker ..... | B60W 10/12 475/220 |
| 9,360,059 B2 * | 6/2016 | Palmer .................. | F16D 41/088 |
| 10,150,369 B2 * | 12/2018 | Thornton ............... | B60K 23/08 |
| 2012/0152686 A1 * | 6/2012 | Brewer .................. | F16D 27/10 192/84.1 |

* cited by examiner

*Primary Examiner* — Jacob S. Scott
(74) *Attorney, Agent, or Firm* — Schmeiser, Olsen & Watts LLP

(57) ABSTRACT

A Sprague carrier for use in a front differential is provided. The Sprague carrier includes an armature plate having a plurality of concentrically located connector apertures. The Sprague carrier also includes a spring-less bearing cage. The spring-less bearing cage includes bearing apertures, bearings coupled within the bearing apertures without springs, and concentrically located connector recesses corresponding to the concentrically located connector apertures of the armature plate. The Sprague carrier further includes connectors engaging the connector apertures of the armature plate and the connector recesses of the bearing cage to couple the armature plate to the bearing cage.

5 Claims, 9 Drawing Sheets

SPRAGUE CARRIER

CROSS REFERENCE TO RELATED APPLICATION[S]

This application is a Continuation of U.S. patent application entitled "SPRAGUE CARRIER," Ser. No. 15/832,443, filed Dec. 5, 2017, which claims priority to U.S. Provisional Patent Application entitled "SPRAGUE CARRIER," Ser. No. 62/430,055, filed Dec. 5, 2016, the disclosures of which are hereby incorporated entirely herein by reference.

BACKGROUND OF THE INVENTION

Technical Field

This invention relates generally to a front differential of a utility vehicle and more particularly to a Sprague carrier for use with a front differential of a utility vehicle.

State of the Art

A utility vehicle ("UTV") are vehicles that often have the ability to operate as a two wheel drive vehicle and a four wheel drive vehicle. This is accomplished by use of a front differential that engages and disengages the front wheels to shift between two wheel drive and four wheel drive. The front differential typically utilizes an armature plate and a Sprague carrier to carry the linear bearings that operate to engage and disengage the front wheels. Conventional Sprague carriers and armature plate suffer from frequent failure and damage. Further, the Sprague utilizes springs, such as H-springs in order to center the linear bearings within the bearing slots of the Sprague carrier, providing yet another component subject to frequent failure.

Accordingly, there is a need for an improved Sprague carrier and armature that is resistant to the failures of conventional Sprague carriers and armatures.

DISCLOSURE OF THE INVENTION

The present invention relates to a Sprague carrier. An embodiment of a Sprague carrier is spring-less and positively locks an armature arm to a bearing cage and is generally used with an electromagnetic clutch, such as, but not limited to, a Hilliard Sprague Clutch.

An embodiment includes a Sprague carrier comprising: an armature plate comprising a plurality of concentrically located connector apertures; a bearing cage comprising: bearing apertures; bearings coupled within the bearing apertures; and concentrically located connector recesses corresponding to the concentrically located connector apertures of the armature plate; and connectors engaging the connector apertures of the armature plate and the connector recesses of the bearing cage to couple the armature plate to the bearing cage.

In some embodiments, the connectors are pins and in other embodiments, the connectors are bolts. Further, the bearing cage is formed of carbon steel.

Another embodiment includes a Sprague carrier for use in a front differential, the Sprague carrier comprising: a two piece armature plate having a fixed portion and a floating ring, wherein the fixed portion comprises teeth equally distributed around an outer circumference of the fixed portion, and the floating ring comprises corresponding teeth equally distributed around an inner circumference of the floating ring; and a bearing cage; the bearing cage comprising: bearing apertures; and bearings coupled within the bearing apertures with coil springs, wherein the fixed portion of the two piece armature plate is fixedly coupled to the bearing cage and the floating ring is moveable between an engaged position with the teeth of the floating ring engaging the teeth of the fixed portion and a disengaged position with the teeth of the floating ring disengaging the teeth of the fixed portion.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
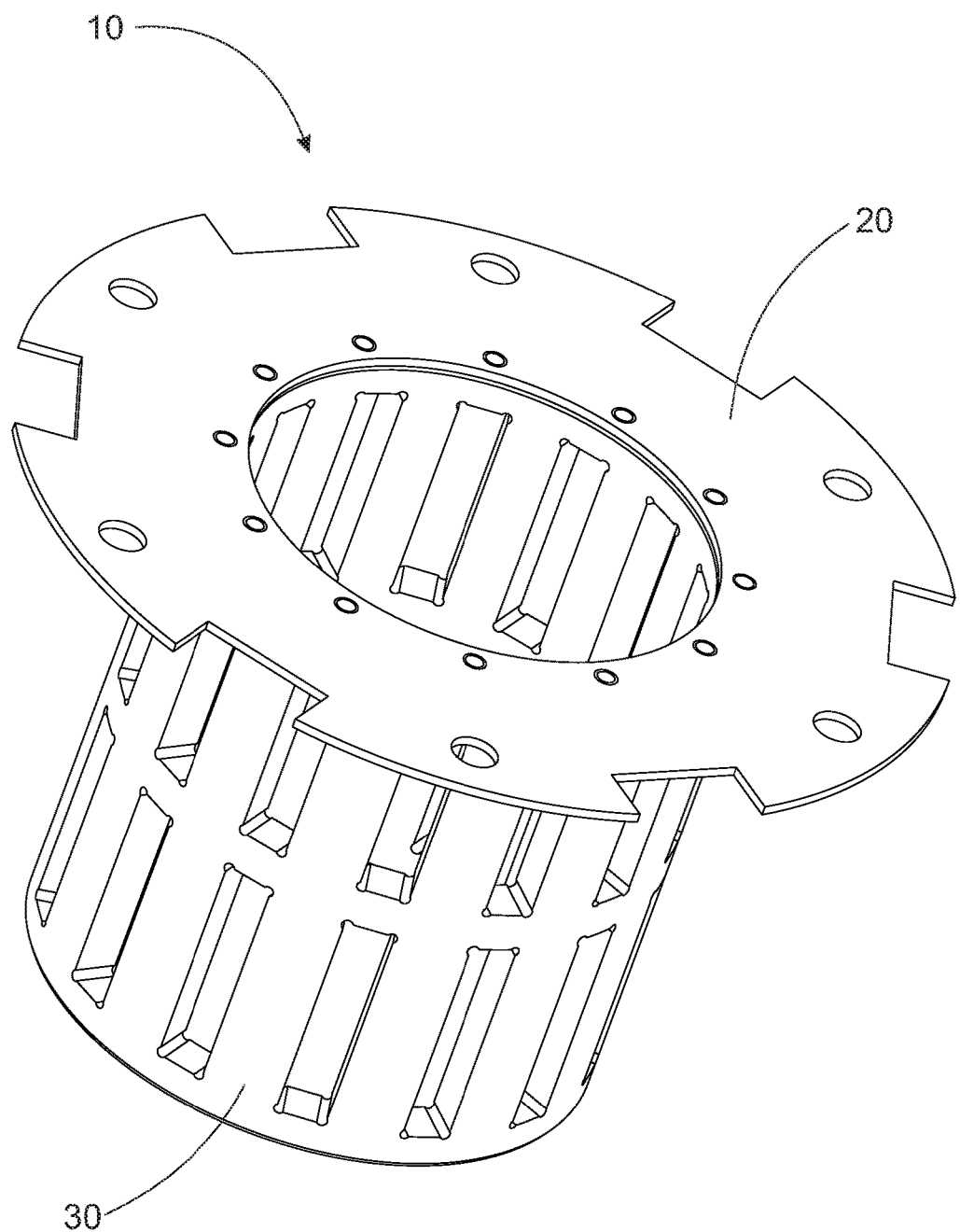
FIG. 1 is a top perspective view of a Sprague carrier according to an embodiment.
Figure 2:
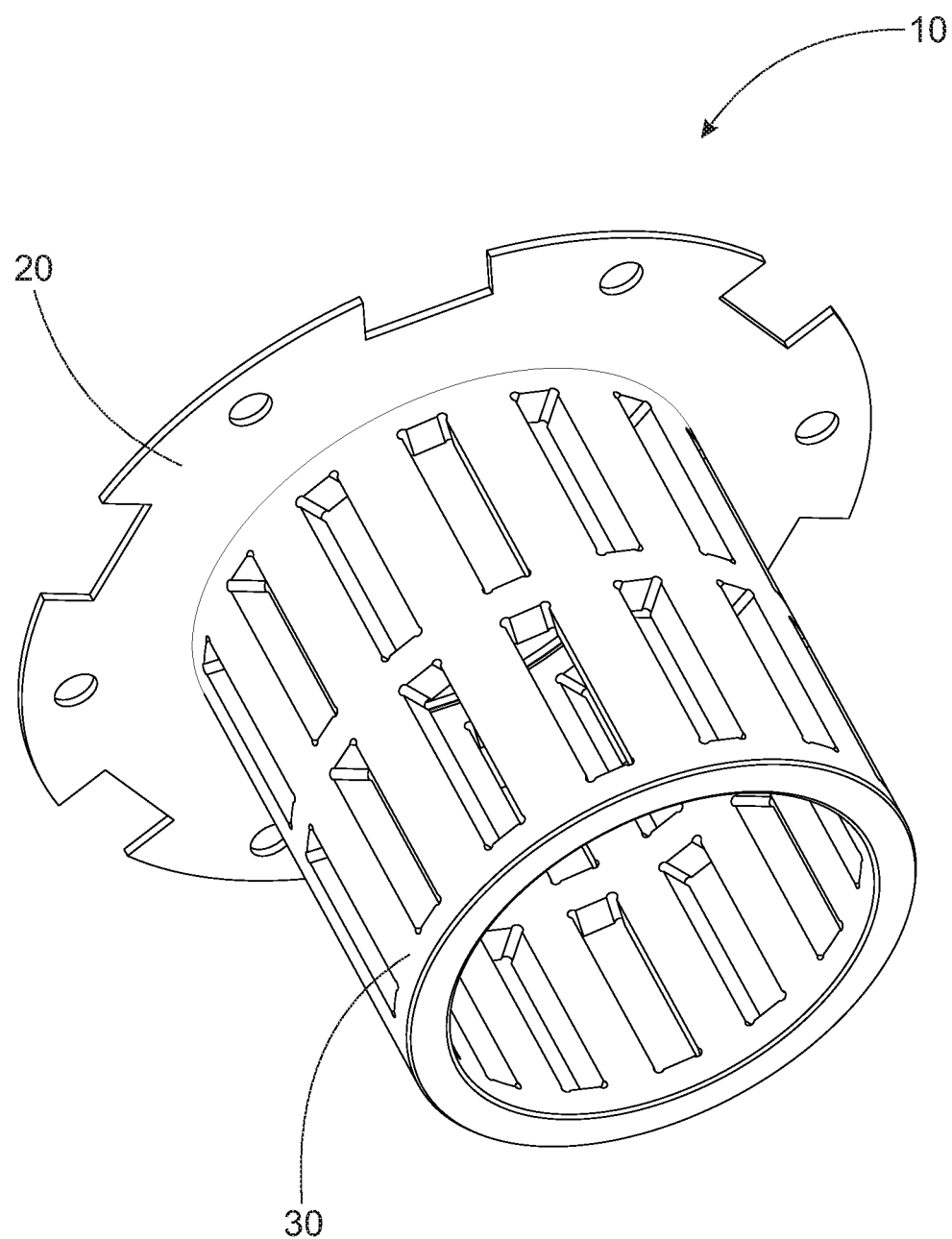
FIG. 2 is a bottom perspective view of a Sprague carrier according to an embodiment.
Figure 3:
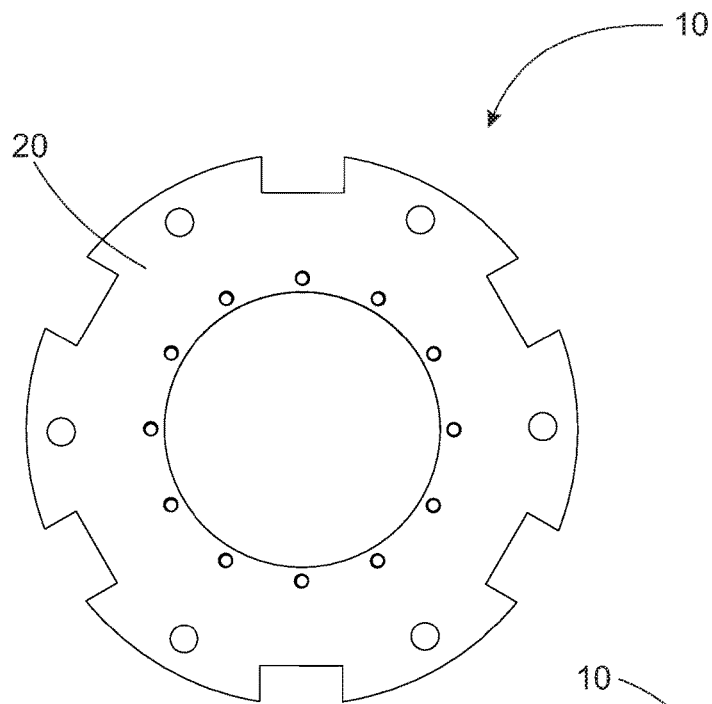
FIG. 3 is a top view of a Sprague carrier according to an embodiment.
Figure 4:
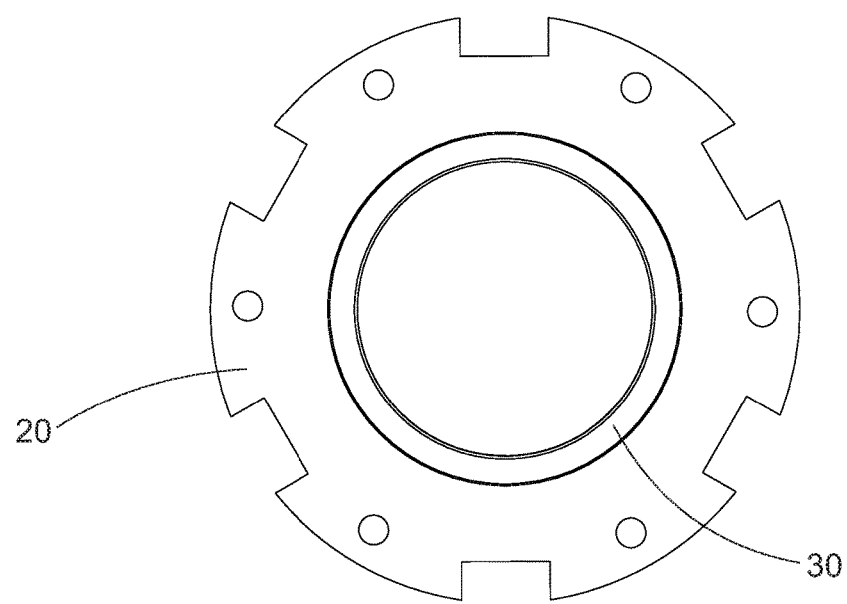
FIG. 4 is a bottom view of Sprague carrier according to an embodiment.
Figure 5:
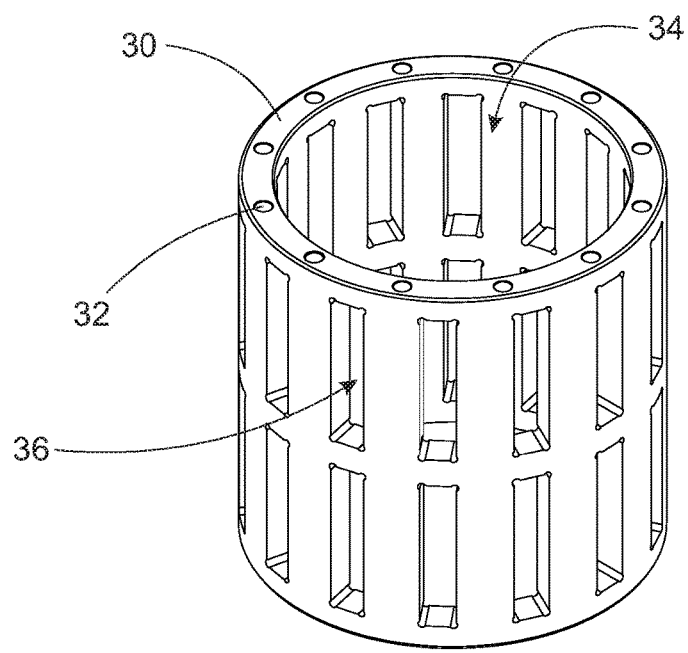
FIG. 5 is a top perspective view of Sprague carrier shown without an armature plate according to an embodiment.
Figure 6:
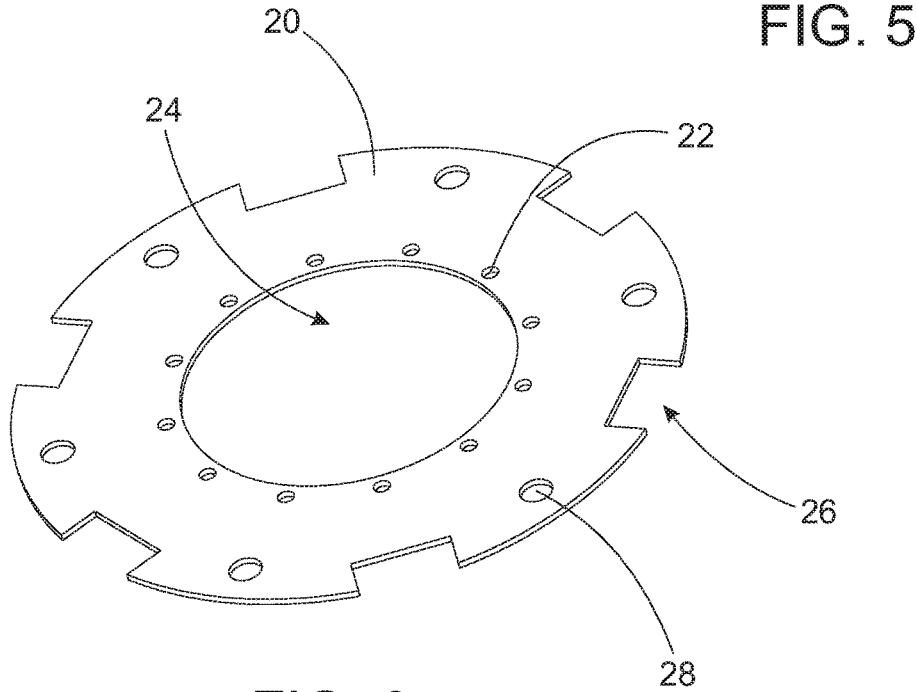
FIG. 6 is a top perspective view of an armature plate according to an embodiment.
Figure 7:
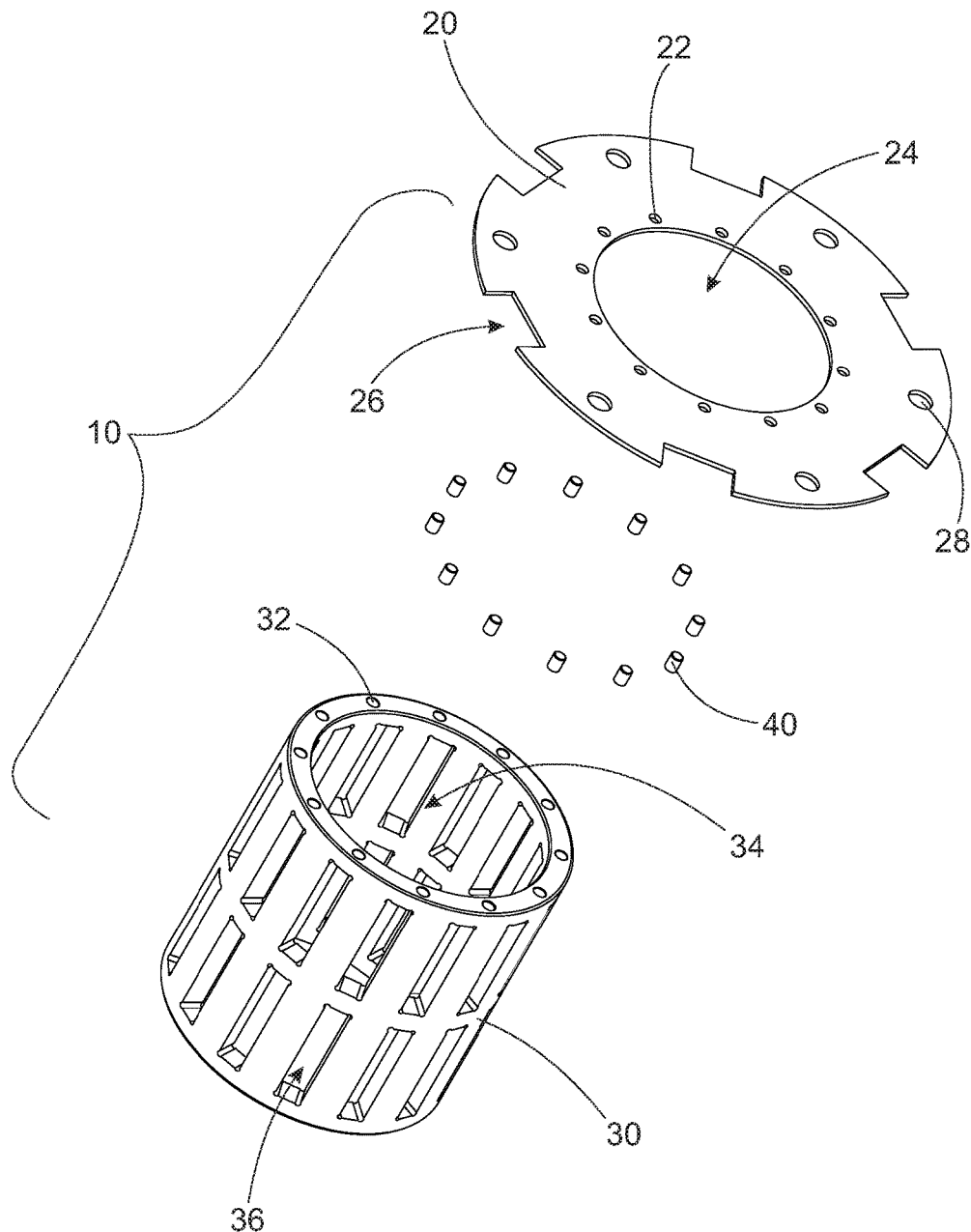
FIG. 7 is an exploded view of Sprague carrier according to an embodiment.

As discussed above, embodiments of the present invention relate to a Sprague carrier. An embodiment of a Sprague carrier is spring-less and positively locks an armature arm to a bearing cage and is generally used with an electromagnetic clutch, such as, but not limited to, a Hilliard Sprague Clutch.

Existing Sprague carriers are created out of plastic or aluminum and use small springs to center rolling bearings in the cage in addition to machined indentations to allow for the engagement of the armature plate or to allow the armature plate to rest in. While this design functions for a period of time, the indentations create a weak point in the cage. The thin design of the factory armature plate also means that the plate is susceptible to bending and folding under large bearing loads. Embodiments of the present invention include a Sprague carrier that does not suffer from these or other limitations.

As shown in FIGS. 1-9, the improved Sprague carrier 10 includes an armature plate 20 and a bearing cage 30. The bearing cage 30 may be a cylindrical shape having a through aperture 34 and uses bearing apertures 36 to keep the bearings 12 within the bearing cage 30. The bearing cage 30 ensures that each bearing 12 is kept straight and does not allow the bearings to twist, shift, or otherwise move out of position. Keeping the bearings aligned with these bearing apertures 36 improves engagement of the bearings as well as the overall strength of the bearing cage 30. Some embodiments utilize a spring-less design as shown in FIGS. 1-9 and other embodiments may include a coil spring 72 extending from recesses 70 and engaging the bearing 12 to keep the bearings 12 within the bearing cage 30, as shown in FIGS. 10-11.

The armature plate 20 comprises a through aperture 24 that corresponds with through aperture 34 of the bearing cage 30. The armature plate 20 includes connector apertures 22 concentrically located and evenly distributed within the armature plate 20. These connector apertures 22 correspond with connector recesses 32 of the bearing cage 30 concentrically located and evenly distributed within the bearing cage 30. Connectors 40 may operate to engage connector recesses 32 of the bearing cage 30 and engage connector apertures 22 of the armature plate 20 to couple the armature plate 20 with the bearing cage 30. In some embodiments, the connectors 40 may be dowel pins, bolts, or the like to positively lock the armature plate 20 to the bearing cage 30. In embodiments, the armature plate 20 may be thicker than the original equipment manufacturer ("OEM") armature plate, wherein the increased thickness increases the strength of the armature plate 20 by up to ten times the strength of the OEM armature plate.

Figure 8:
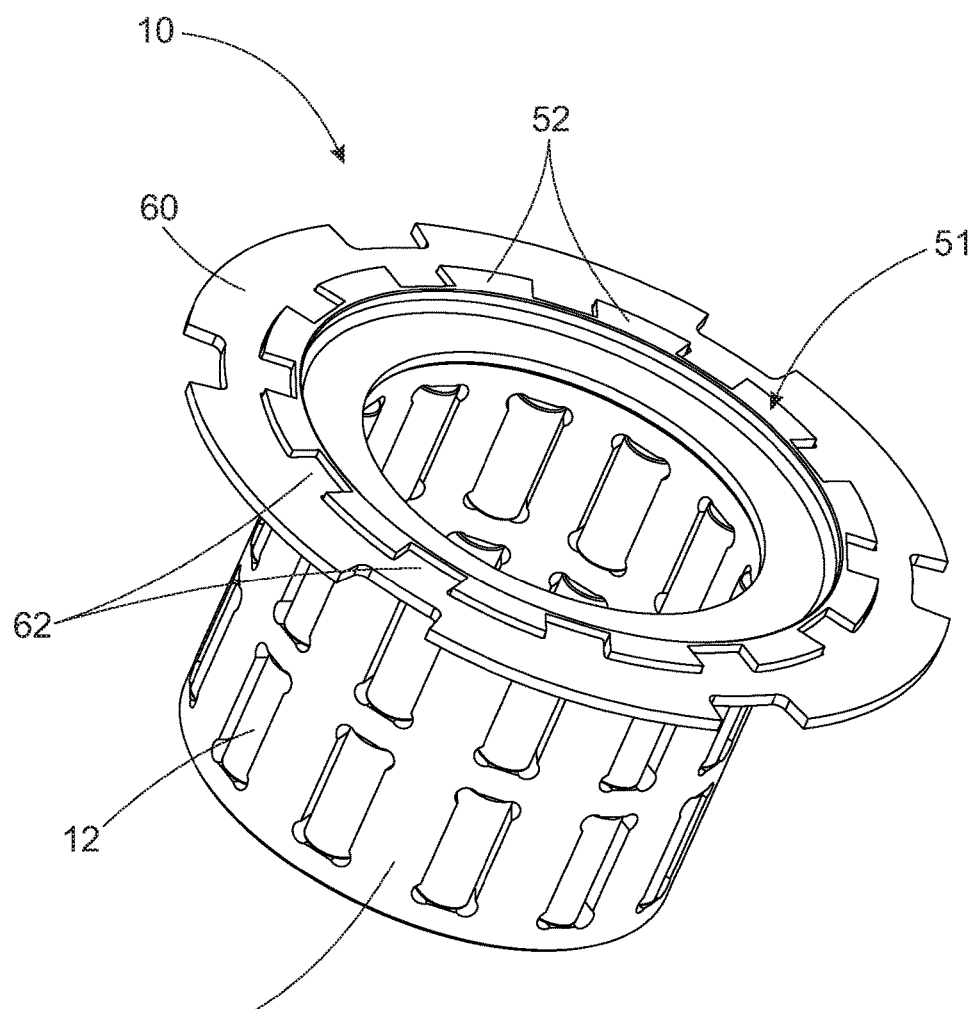
FIG. 8 is a top perspective view of a Sprague carrier according to an embodiment.
Figure 9:
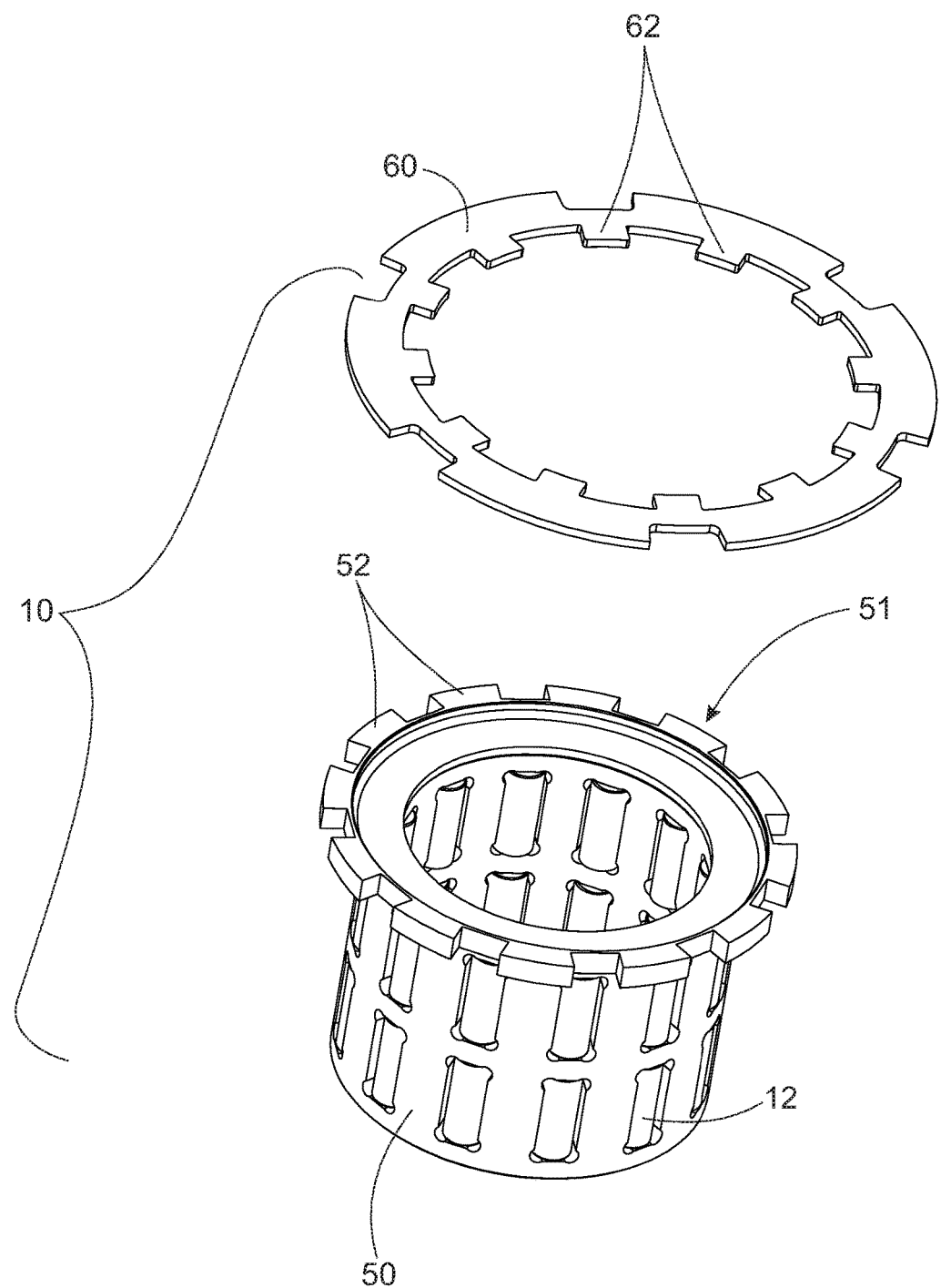
FIG. 9 is an exploded view of Sprague carrier according to an embodiment.

Alternate embodiments of the improved Sprague carrier 10 may include a two piece armature plate, wherein a fixed portion 51 that is fixedly coupled to bearing cage 50 and a floating ring 60. In some embodiments, this means that the bearing cage 50 and the fixed portion 51 are formed as a unitary structure formed of a single piece of material. The fixed portion 51 includes a plurality of teeth 52 equally distributed around an outer circumference of the fixed portion 51. The two piece armature plate for this alternate embodiment may also include a floating ring 60 that operatively engages the fixed portion 51 of the bearing cage 50. The floating ring 60 comprises a plurality of teeth 62 equally distributed around an inner circumference of the floating ring 60. The floating ring 60 engages the fixed portion 51 in response to the teeth 62 of the floating ring 60 engaging the teeth 52 of the fixed portion 51, as shown in FIG. 8. Once the floating ring 60 is engaged with the fixed portion 51, the Sprague carrier 10 operates in the same manner as other embodiments described above and in the same manner as the OEM Sprague carrier.

Figure 10:
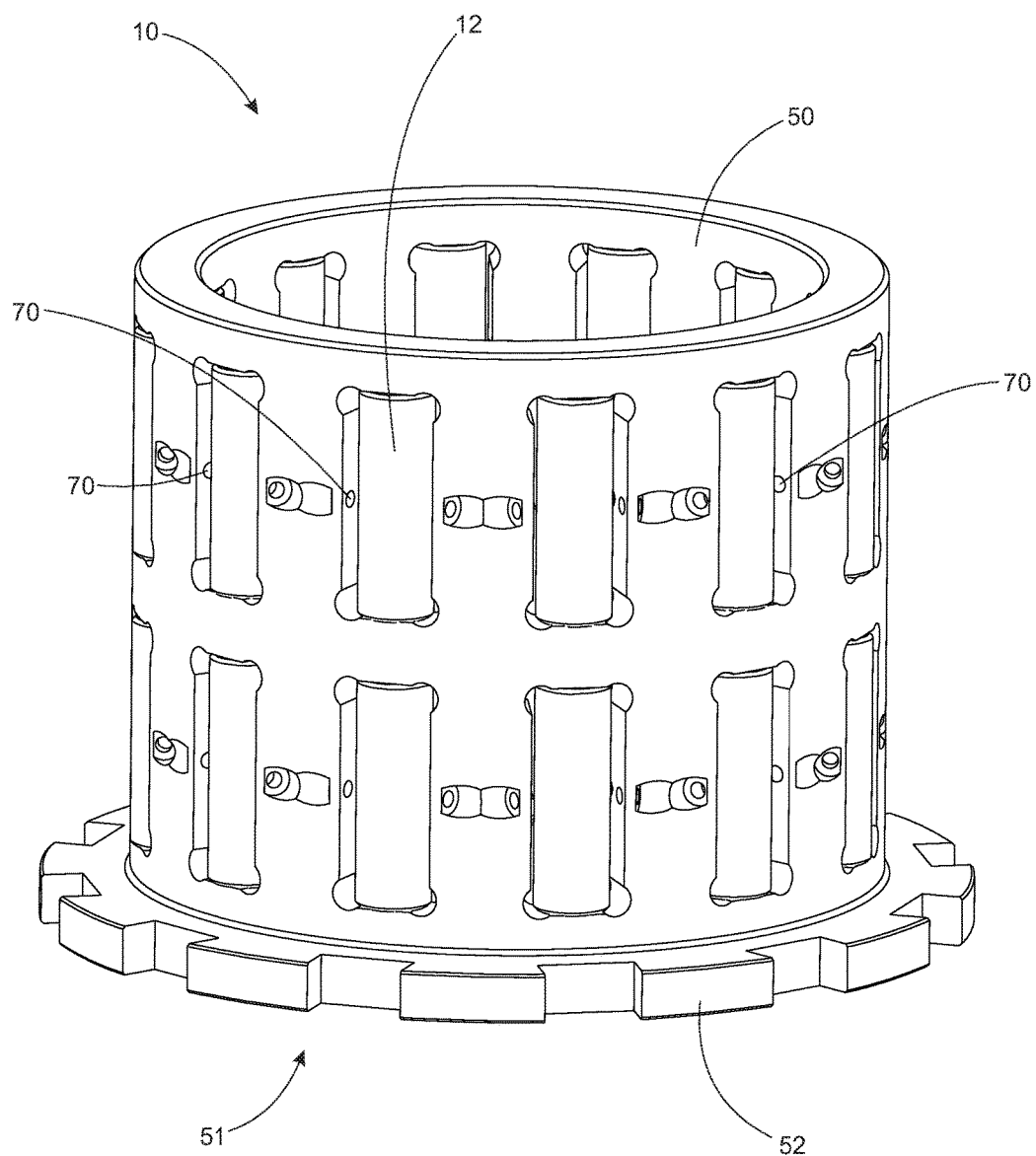
FIG. 10 is a perspective view of a Sprague carrier according to an embodiment.
Figure 11:
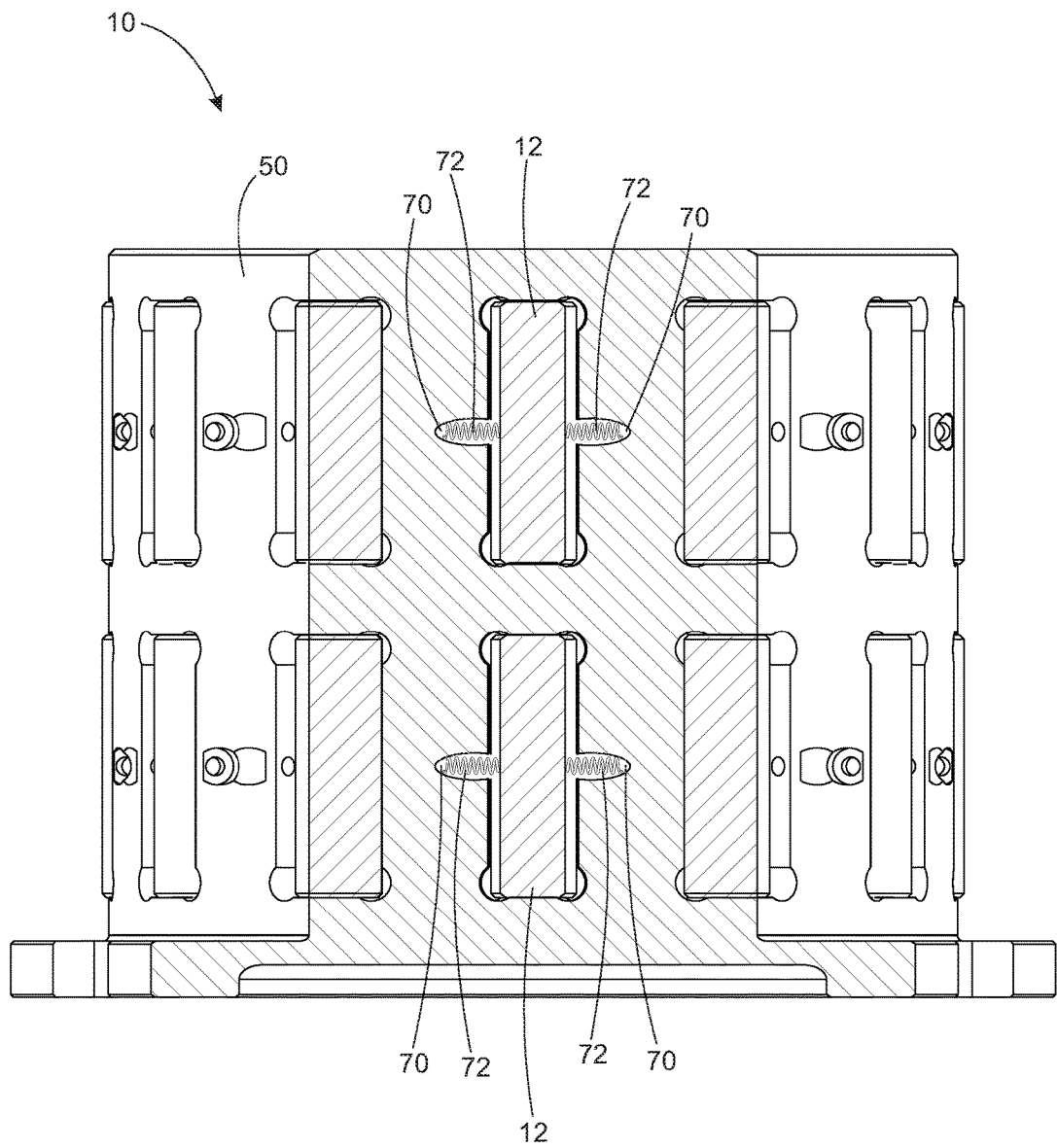
FIG. 11 is a section view of a Sprague carrier according to an embodiment.

In another embodiment, as shown in FIGS. 10-11, the fixed portion 51 may be the armature plate. In this embodiment, the bearing cage 50 and the armature plate 51 are formed as a unitary structure formed of a single piece of material. The armature plate 51 includes a plurality of teeth 52 equally distributed around an outer circumference of the armature plate 51.

The bearing cage 30 may be formed of various types of material. In some embodiments, the bearing cage 30 may be formed with carbon steel instead of plastic or aluminum. The carbon steel also increases the strength of the bearing cage 30 significantly over the OEM bearing cage.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A Sprague carrier for use in a front differential, the Sprague carrier comprising:
   a two piece armature plate comprising:
      a fixed portion fixedly coupled to a bearing cage; and
      a floating ring, wherein the fixed portion comprises teeth equally distributed around an outer circumference of the fixed portion, and the floating ring comprises corresponding teeth equally distributed around an inner circumference of the floating ring, wherein the fixed portion of the two piece armature plate is fixedly coupled to the bearing cage and the floating ring is moveable between an engaged position with the teeth of the floating ring engaged with the teeth of the fixed portion and a disengaged position with the teeth of the floating ring disengaged from the teeth of the fixed portion.

2. The Sprague carrier of claim 1, wherein the fixed portion and the bearing cage are formed as a unitary piece.

3. The Sprague carrier of claim 2, wherein the bearing cage and the fixed portion are formed from a single piece of carbon steel.

4. The Sprague carrier of claim 1, wherein the bearing cage comprises bearing apertures; and bearings coupled within the bearing apertures.

5. The Sprague carrier of claim 4, wherein the bearings are coupled within the bearing apertures with coil springs.

* * * * *